United States Patent
Lee et al.

(10) Patent No.: US 10,421,388 B2
(45) Date of Patent: Sep. 24, 2019

(54) VEHICLE LIGHT ASSEMBLY AND LIGHTING METHOD

(71) Applicant: Bentley Motors Limited, Cheshire (GB)

(72) Inventors: Sangyup Lee, Cheshire (GB); David Leary, Whitchurch (GB)

(73) Assignee: Bentley Motors Limited, Pym's Lane, Crewe, Cheshire (GB)

(*) Notice: Subject to any disclaimer, the term of this patent is extended or adjusted under 35 U.S.C. 154(b) by 5 days.

(21) Appl. No.: 15/552,324

(22) PCT Filed: Feb. 22, 2016

(86) PCT No.: PCT/GB2016/050435
§ 371 (c)(1),
(2) Date: Aug. 21, 2017

(87) PCT Pub. No.: WO2016/135461
PCT Pub. Date: Sep. 1, 2016

(65) Prior Publication Data
US 2018/0236926 A1    Aug. 23, 2018

(30) Foreign Application Priority Data
Feb. 26, 2015 (GB) .................................. 1503233.7

(51) Int. Cl.
*B60Q 1/00* (2006.01)
*B60Q 1/04* (2006.01)
(Continued)

(52) U.S. Cl.
CPC ...... *B60Q 1/0011* (2013.01); *B29D 11/00663* (2013.01); *B60Q 1/0052* (2013.01);
(Continued)

(58) Field of Classification Search
CPC .. B60Q 1/0011; B60Q 1/0052; B60Q 1/2696; B60Q 1/28; B60Q 1/30; F21S 41/24;
(Continued)

(56) References Cited

U.S. PATENT DOCUMENTS 7,055,999 B2* 6/2006 Lin ...................... B60Q 1/0052
362/511
7,097,336 B2* 8/2006 Lin ...................... B60Q 1/0052
362/249.14
(Continued)

FOREIGN PATENT DOCUMENTS

DE    102006016656 A1    10/2007
DE    102008021902 A1    11/2009
(Continued)

*Primary Examiner* — Bryon T Gyllstrom
(74) *Attorney, Agent, or Firm* — Barlow, Josephs & Holmes, Ltd.

(57) ABSTRACT

A light assembly (2) such as for a headlight comprises a housing (9), the housing (9) having a rear and a front, whereby in use light is emitted from the front of the housing (9). A transparent or translucent light guide (10, 110) extends from the rear to the front and at least partially surrounded by the housing (9). The light guide (10, 110) lit at its rear and emits light along at least part of its length. It is provided with formations (17, 117) so as to take the appearance of cut glass or crystal and is used as a park light and as part of a welcome sequence.

20 Claims, 5 Drawing Sheets

(51) Int. Cl.

| | | |
|---|---|---|
| *B60Q 1/26* | (2006.01) | |
| *B60Q 1/28* | (2006.01) | |
| *B60Q 1/30* | (2006.01) | |
| *B29D 11/00* | (2006.01) | |
| *F21S 41/24* | (2018.01) | |
| *F21S 41/32* | (2018.01) | |
| *F21S 43/14* | (2018.01) | |
| *F21S 43/40* | (2018.01) | |
| *F21S 41/141* | (2018.01) | |
| *F21S 43/241* | (2018.01) | |
| *F21S 43/245* | (2018.01) | |
| *F21S 43/249* | (2018.01) | |
| *F21Y 105/10* | (2016.01) | |
| *F21Y 105/18* | (2016.01) | |
| *F21Y 115/10* | (2016.01) | |

(52) U.S. Cl.
CPC ............. *B60Q 1/04* (2013.01); *B60Q 1/2696* (2013.01); *B60Q 1/28* (2013.01); *B60Q 1/30* (2013.01); *F21S 41/141* (2018.01); *F21S 41/24* (2018.01); *F21S 41/32* (2018.01); *F21S 43/14* (2018.01); *F21S 43/241* (2018.01); *F21S 43/245* (2018.01); *F21S 43/249* (2018.01); *F21S 43/40* (2018.01); *B60Q 2400/30* (2013.01); *B60Q 2400/40* (2013.01); *F21Y 2105/10* (2016.08); *F21Y 2105/18* (2016.08); *F21Y 2115/10* (2016.08)

(58) Field of Classification Search
CPC ........ F21S 41/141; F21S 41/32; F21S 43/249; F21S 43/40; F21S 43/14; F21S 43/245; F21S 43/241; B29D 11/00663
USPC ........................................................ 362/511
See application file for complete search history.

(56) References Cited

U.S. PATENT DOCUMENTS

| | | | | |
|---|---|---|---|---|
| 7,452,119 B2* | 11/2008 | Onishi | ................. | G02B 6/0036 362/235 |
| 8,454,191 B2* | 6/2013 | Chang | .................... | G02B 6/001 313/114 |
| 2004/0141303 A1* | 7/2004 | Ladstaetter | ............. | F21V 5/002 362/615 |
| 2005/0259939 A1* | 11/2005 | Rinko | .................. | G02B 6/0018 385/146 |
| 2008/0002427 A1* | 1/2008 | Kropac | .................... | B60Q 1/26 362/606 |
| 2010/0315826 A1* | 12/2010 | Anderson | .............. | G02B 6/001 362/511 |
| 2013/0010486 A1* | 1/2013 | Natsume | .............. | G02B 6/0046 362/511 |
| 2013/0027956 A1* | 1/2013 | Dubosc | ................. | F21S 43/145 362/511 |
| 2013/0127340 A1* | 5/2013 | Huhn | ................... | B60Q 1/0041 315/77 |
| 2014/0140084 A1* | 5/2014 | Zwick | ..................... | B60Q 1/26 362/511 |
| 2014/0160779 A1* | 6/2014 | Pusch | .................. | B60Q 1/2607 362/511 |

FOREIGN PATENT DOCUMENTS

| | | |
|---|---|---|
| DE | 102011051541 A1 | 1/2013 |
| EP | 2407709 A2 | 1/2012 |
| EP | 2543925 A2 | 1/2013 |
| EP | 2567866 A2 | 3/2013 |
| EP | 2568321 A2 | 3/2013 |
| EP | 2596992 A2 | 5/2013 |
| FR | 2776251 A1 | 9/1999 |
| FR | 2799263 A1 | 4/2001 |
| FR | 3008775 A1 | 1/2015 |
| GB | 2066444 A | 7/1981 |
| JP | 2000003607 A | 1/2000 |
| JP | 2005122946 A | 5/2005 |
| JP | 2010021001 A | 1/2010 |
| JP | 2011076858 A | 4/2011 |
| JP | 2012064535 A | 3/2012 |
| JP | 2013048036 A | 3/2013 |

* cited by examiner

VEHICLE LIGHT ASSEMBLY AND LIGHTING METHOD

TECHNICAL FIELD OF THE INVENTION

The present invention relates to a light assembly for a vehicle and in particular, but not exclusively to an automotive exterior light assembly, especially a headlight assembly or taillight assembly. It also relates to a method of operating such a light assembly and a method of forming such an assembly.

BACKGROUND TO THE INVENTION

Automotive light assemblies typically comprise an opening for a replaceable main light source, which may be a halogen or xenon bulb or the like, or a matrix module, which an LED matrix sits behind. A generally conical reflective housing (or "reflector") is situated around the main light source to direct light outwards and a transparent (or translucent) front lens is situated in front of the reflective to close the assembly.

Additional light sources may be situated behind the same front lens and various shapes of reflective housing may be provided to guide light from different sources (e.g. a main beam-bulb, a dipped beam-bulb and an indicator bulb). With the advent of LED technology, various shapes can be formed by a matrix of LEDs, so for example, daylight running lights/park lights can take more desirable forms, fitting to, or emphasizing the shape of parts of the vehicle.

Especially in the luxury automobile market, it is desirable for automotive lights/light assemblies to take novel forms and perform additional functions.

SUMMARY OF THE INVENTION

According to a first aspect of the present invention, there is provided a light assembly comprising a housing, the housing having a rear and a front, whereby in use light is emitted from the front of the housing; the assembly further comprising a transparent or translucent light guide extending from the rear to the front and at least partially surrounded by the housing; the light guide arranged to be lit at its rear and to emit light along at least part of its length.

The provision of a light guide through which light is emitted along its length can allow the formation of desirable patterns of light. In particular, the emission of light along the length of the guide can give the appearance of depth and a three dimensionality lacking from many patterns in LEDs.

The housing may be reflective. The reflective housing may have a high-gloss finish, or may be mirrored.

The light assembly may comprise a light source arranged to light the rear of the light guide.

The light guide may be tubular, having an interior surface, an exterior surface, a front end, a rear end, and a passage extending therebetween.

A tubular shape is especially evocative of cut glass or crystal and can reveal particularly unusual and attractive patterns of light.

The light source may comprise an array of light sources arranged in a ring at the rear end of the tubular light guide. The light sources may be LEDs The light guide may be provided with formations on/in its surface to emit light along at least part of its length.

The formations on/in the surface of the light guide may be grooves formed in the surface or lines frosted on a surface of the light guide. The grooves may be V-shaped. The grooves or lines may be formed in the surface facing a user, in use, i.e. the radially inside surface of a tubular light guide that is located adjacent the housing.

The formations may criss-cross the surface of the light guide.

The light guide may be provided with formations of one type on one surface (e.g. the interior surface of the tubular light guide) and formations of another type on the other surface (e.g. the outer surface of the tubular light guide).

The formations on one surface may be grooves and the formations on the other surface may comprise facets arranged such that the pattern of light emitted replicates that of light through cut glass.

The facets may be formed by pyramidal formations extending from the surface of the light guide.

The formations may be notches, dimples, bumps or the like.

The thickness of the light guide may reduce from the rear to the front.

The light guide may flare from the rear to the front.

The housing may be provided with an aperture at the rear to receive a main light source, such as a main or dipped beam bulb, or a matrix module and the assembly may comprise such a main light source. The light source which lights the rear of the light guide may be an auxiliary light source.

The transparent/translucent light guide may be tinted—in particular it may be tinted blue or green to enhance the crystal-like appearance.

The transparent or translucent light guide may be formed of plastics material. The light guide may be injection moulded, in particular formed by a two-stage injection moulding process. Alternatively the formations may be machined into the light guide.

The light guide may be formed so as to emit at least 50% of the light that it receives from the light source at its rear, along its length. The light guide may be formed so as to emit substantially all the light that it receives from the light source at its rear, along its length.

The emission of light mainly along the length, rather than from the front of the light guide, makes the appearance like that of cut glass or crystal more apparent than if a substantial amount of the light from the rear is transmitted through the light guide and emitted from its front.

The light guide may be formed of PMMA (Poly(methyl methacrylate)).

The light guide may be completely surrounded by the housing. The light guide may be located adjacent the housing, in particular, the light guide may be located adjacent the housing along its entire length.

The light assembly may be a vehicle light assembly, in particular an exterior vehicle light assembly, such as a headlight assembly or a taillight assembly. The light guide may be a park light.

According to a second aspect of the invention, there is provided an automobile comprising a light assembly as defined above (including any of the preferred aspects). In particular there is provided an automobile comprising a light assembly as defined above as the headlight and/or park light.

According to a third aspect of the invention there is provided a method of operating a light assembly; the light assembly comprising a housing, the housing having a rear and a front, whereby in use light is emitted from the front of the housing; the assembly further comprising a transparent or translucent light guide extending from the rear to the front and at least partially surrounded by the reflective housing; the light guide arranged to be lit at its rear and to emit light along at least part of its length; and a light source arranged at the rear of the light guide; the method comprising gradually increasing the intensity of light supplied by the light source, such that light appears to slowly progress along the length of the light guide.

The light assembly may be a light assembly according to the first or second aspect of the invention including any or all of the preferred features.

The light source arranged at the rear of the light guide, to light the light guide, may be an array of light sources, e.g. LEDs and the method may comprise increasing the number of light sources that are lit, so as to increase the intensity of light. Alternatively the intensity of light from the or each light source may be gradually increased, for example by changing pulse duration.

The light intensity may be gradually increased over the course of 3-10 seconds. The method may further comprise gradually reducing the intensity of light, e.g. over the course of 3-10 seconds.

The method may comprise gradually increasing the intensity of light supplied by the light source, then illuminating a further light source, e.g. a daylight running light, then gradually reducing the intensity of the light supplied by the light source.

The method may be a welcome sequence and the light guide may also act as a park light.

According to a fourth aspect of the invention there is provided a method of forming a light guide according to the first aspect of the invention, the method comprising a two-stage injection moulding process, whereby a main body portion of the light guide is formed in a first injection moulding step and formations on at least one surface are formed in a second step.

Formations of one type may be formed on one surface and formations of another type may be formed on the other surface. In particular, grooves on one surface may be formed in the first step and facets in an opposing surface may be formed in the second step.

The light assembly according to the first aspect of the invention may include any or all of the preferred features.

This two stage process prevents sinking or deformation in the main body of the light guide, since large formations are not formed in that step. This keeps a thick, glass-like shape and allows sharp edges to be formed in the second formation forming step.

Alternatively, in a fifth aspect of the invention, there is provided a method of forming a vehicle light assembly comprising machining a light guide so as to have formations of one type on one surface and formations of another type on another surface.

The light assembly may be a light assembly according to the first or second aspect of the invention including any or all of the preferred features.

DETAILED DESCRIPTION OF THE INVENTION

In order that the invention may be more clearly understood an embodiment thereof will now be described, by way of example only, with reference to the accompanying drawings, of which:

Figure 1:
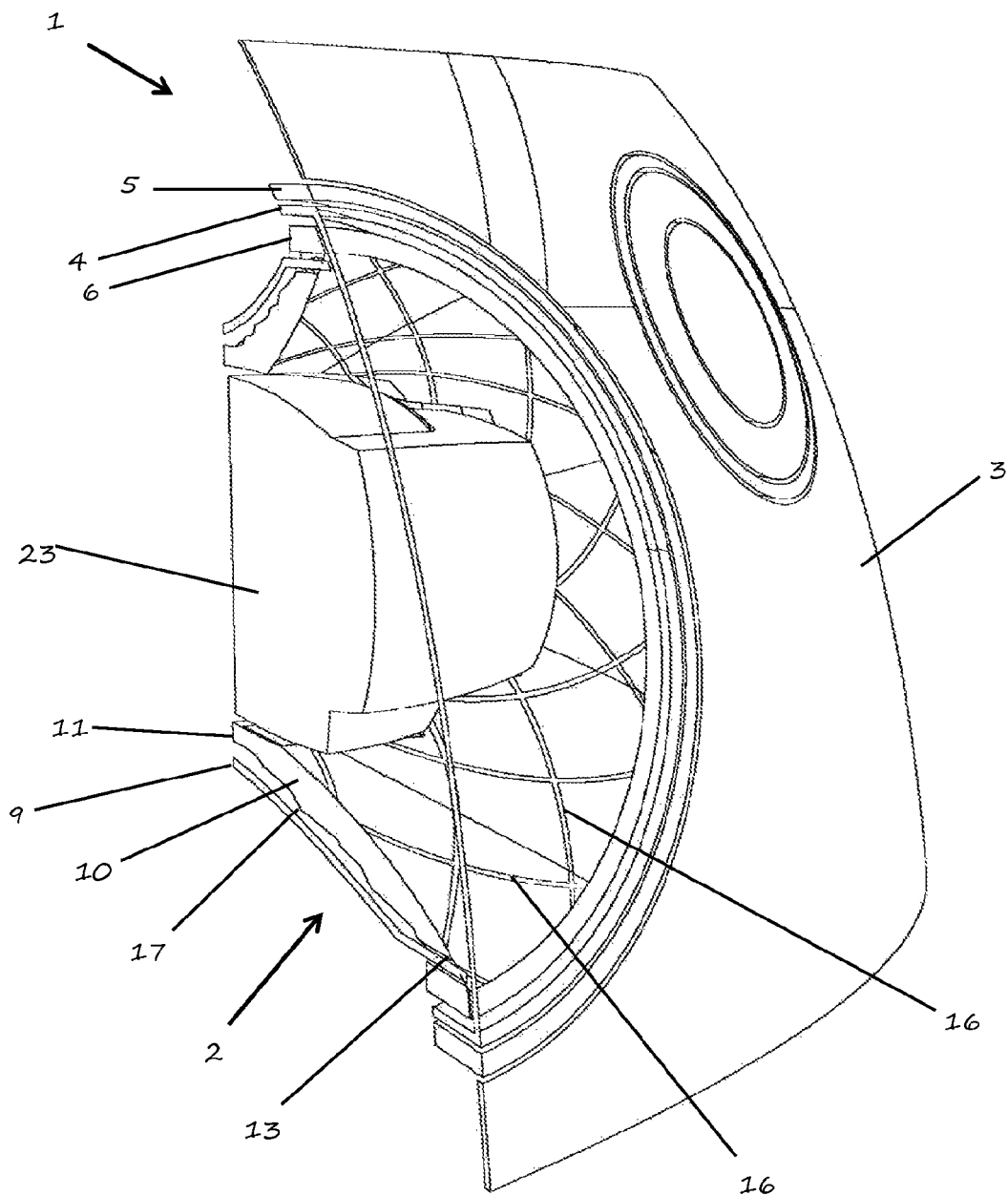
FIG. 1 shows a part-cross sectional isometric view through a light assembly according to the invention.
Figure 2:
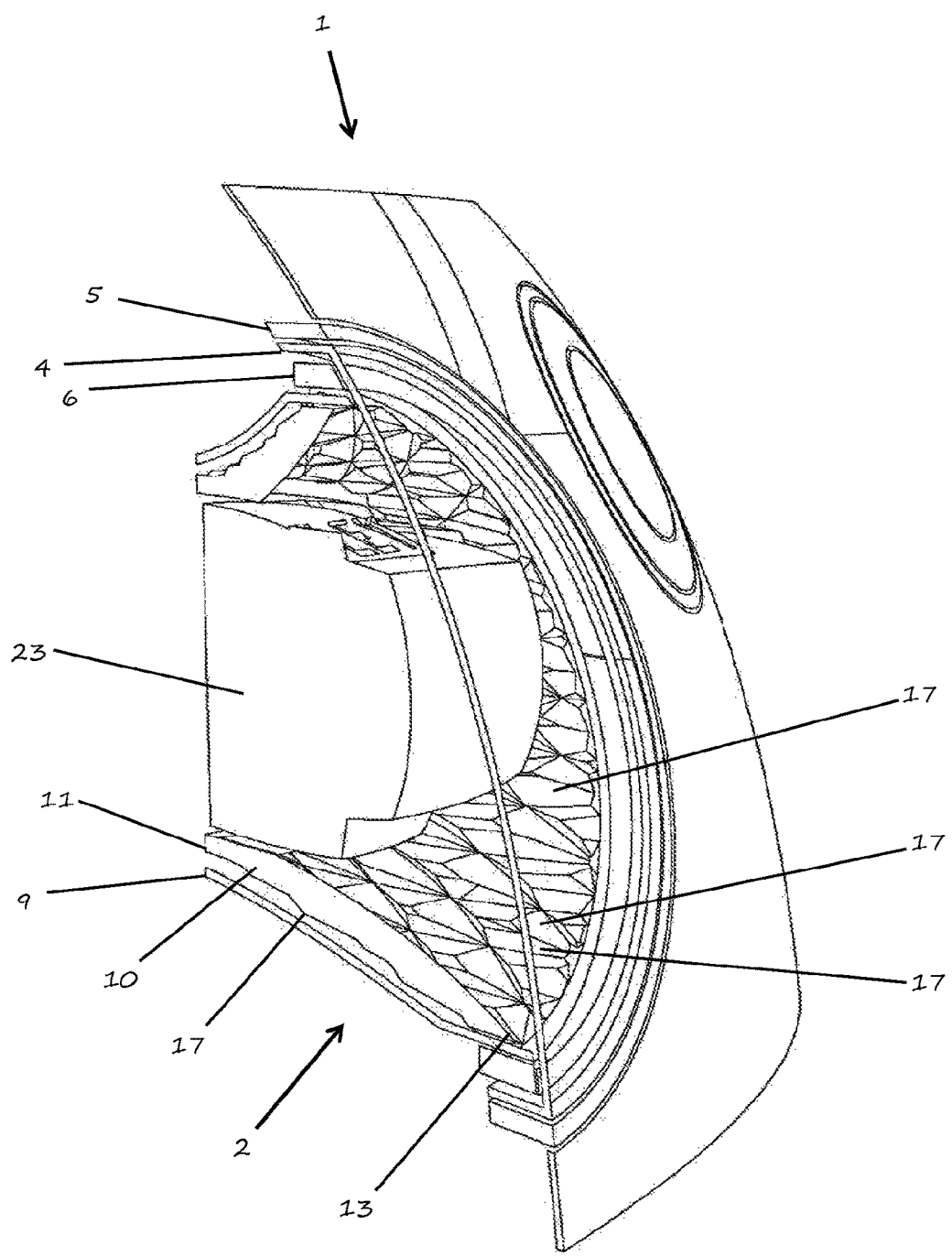
FIG. 2 shows a part-cross sectional isometric view through the light assembly of FIG. 1, but not showing the front surface of the light guide, so that the shape of the rear surface is visible.
Figure 3:
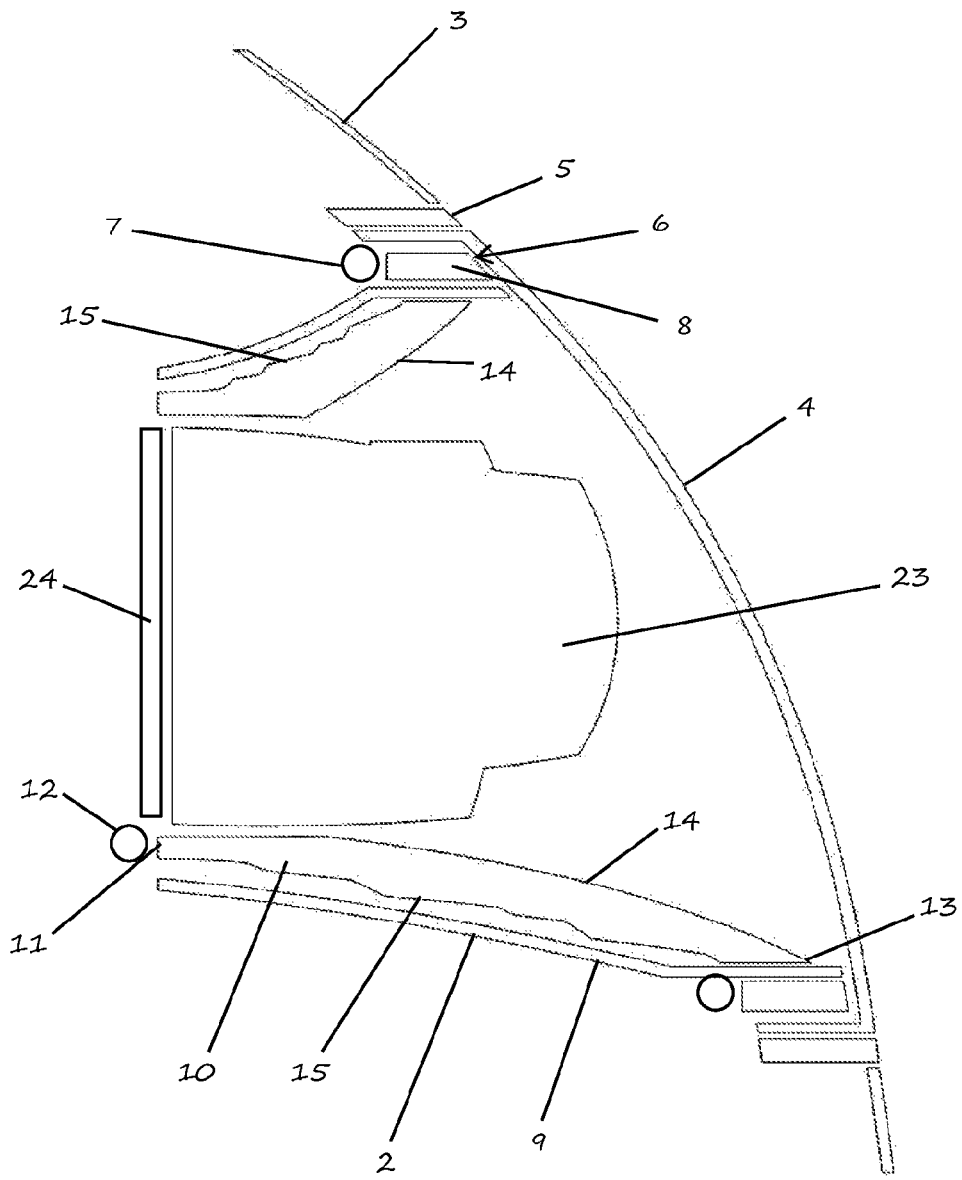
FIG. 3 shows a simplified cross sectional view through the light assembly of FIG. 1, together with schematically illustrated light sources.
Figure 4A:
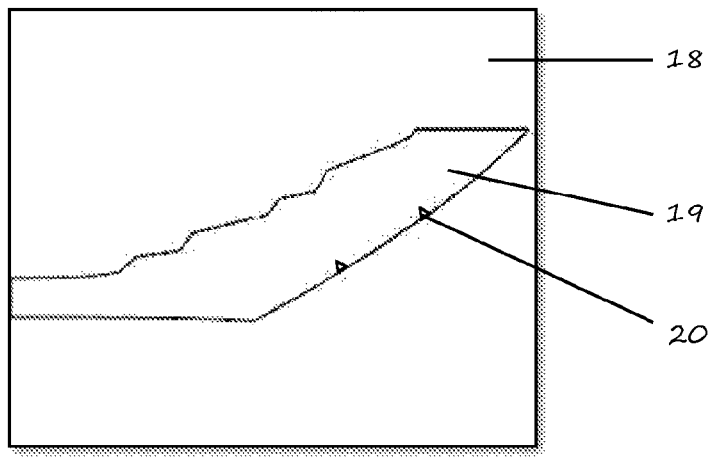
Figure 4B:
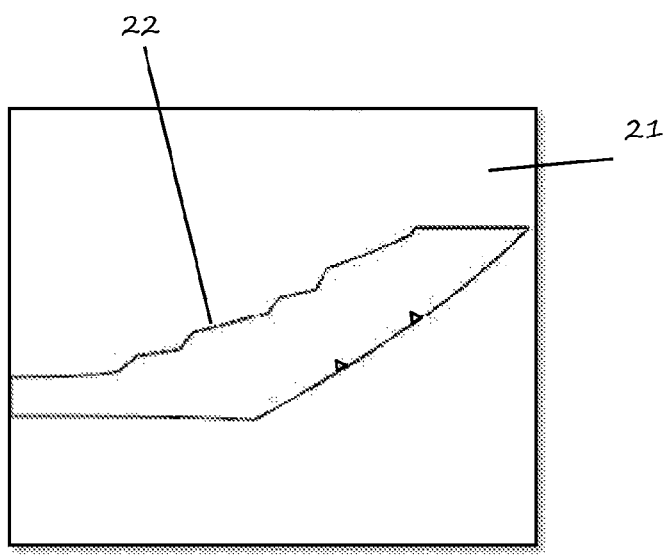
Figure 5:
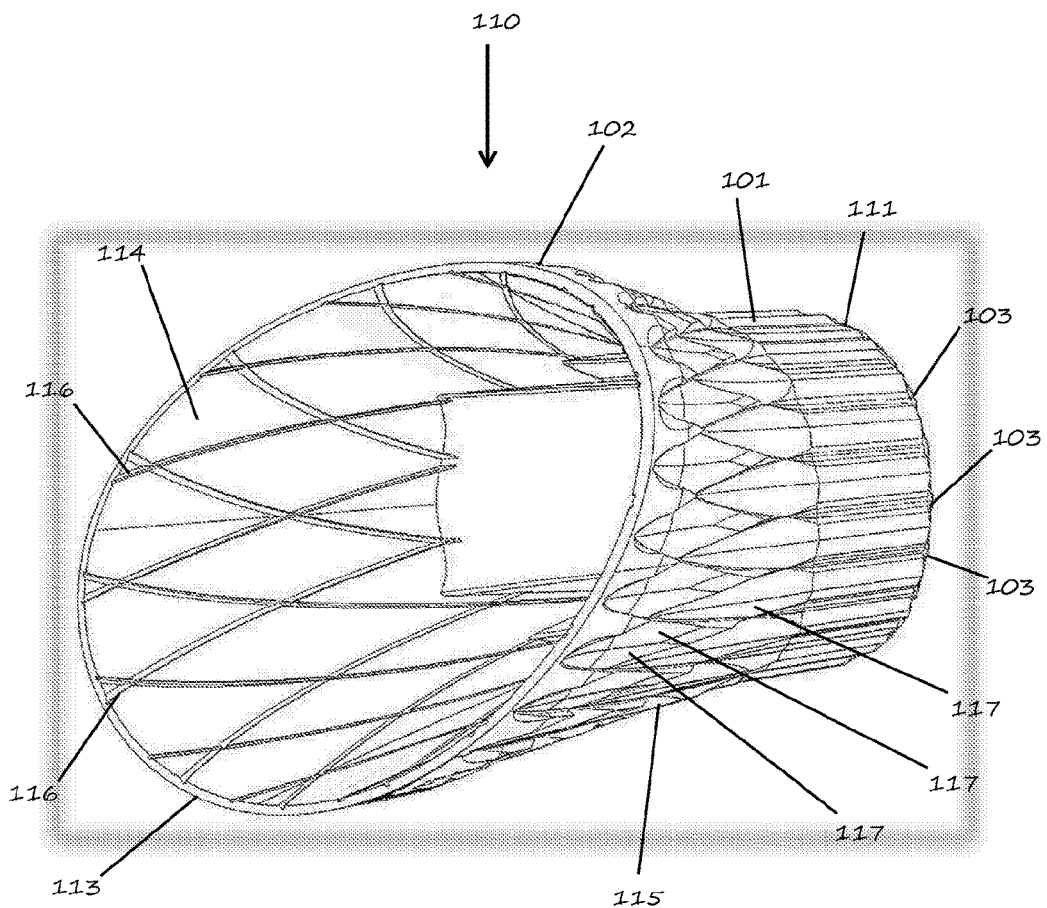

FIGS. 4a-b show schematically a tool for manufacturing the light guide of FIGS. 1-3; and FIG. 5 shows a perspective view of a light guide of a second embodiment of the invention in the absence of the other parts of the light assembly.

With reference to FIGS. 1 to 3, an automobile 1 is provided with a light assembly 2 which fits in an aperture in a body panel 3. In the present embodiment, the light assembly 2 is a headlight assembly located at the front of the vehicle.

The light assembly 2 comprises a transparent front lens 4, which may be formed of any conventional material, such as polycarbonate, which is affixed to the body of the automobile 1. In this particular embodiment an optional, decorative, e.g. chrome, ring 5 encircles the front of the lens 4.

Behind the lens 4, at the periphery, a daytime running lamp 6 is situated. The daytime running lamp 6 comprises a light source 7 situated in an array, behind tubular light guiding ring 8. The light guiding ring 8 is arranged to guide light from the rear, where the light source 7 is arranged, to the front, to attract attention. This light guiding ring 8 is designed to ensure the passage of light through the ring, without losses along its length and may be provided with a reflective coating around its inner and outer surfaces to avoid such losses.

A generally frustoconical tubular reflective housing 9 is located radially inwardly of the daytime running lamp 6. The reflective housing is of black high-gloss plastic, (e.g. ABS (Acrylonitrile butadiene styrene) plastic or PC (polycarbonate)) so as to reflect light. It need not be mirrored, but may comprise different coloured reflective elements. Owing to the complex shapes often adopted by light assemblies, although generally frustoconical, the top part of the reflective housing 9 flares outwardly whilst the bottom part is straighter, and the bottom is longer than the top part—the front of the generally frustoconical tubular reflective housing 9 terminates with a part cylindrical region. An opening is provided in the rear of the tubular reflective housing 9.

Within the reflective housing 9, adjacent to and surrounded by the housing, a tubular light guide 10 is located. The tubular light guide 10 formed of PMMA and is also generally frustoconical, following the shape of the reflective housing 9 and extending from the opening at the rear towards the lens 4 at the front.

In contrast to the light guiding ring of the daylight running lamp 6, which is intended to guide light from the rear to the front with minimal loss along its length, the tubular light guide 10 is deliberately formed so as to emit light along its length.

To that end, the rear of the tubular light guide 10 is provided with an annular rear surface 11, which receives light from a corresponding light source 12, which may be formed as an array of LEDs arranged to direct light towards the annular rear surface 11. On the other hand, the front of the tubular light guide 10 tapers to a sharp edge 13.

The annular rear surface 11 is provided with facets thereon to diffuse light received from the light source 12

Along the length of the tubular light guide 10, formations are made in the radially inside surface 14 and the radially outside surface 15 of the light guide 10, which reflect light and cause it to be emitted along the length of the tubular light guide 10. In particular, the radially inside surface 14 is provided with a series of criss-crossing grooves 16 which extend obliquely across the light guide from near the rear to the front.

The radially outside surface, on the other hand, which is best seen in FIG. 2, is provided with facets 17, having sharp corners, so as to make up pyramidal formations which are suitably aligned behind the grooves 16, to give the appearance of cut glass/crystal.

The tubular light guide 10 is formed from blue-tinted polycarbonate by a two shot injection moulding process, illustrated schematically with reference to FIGS. 4a and 4b. As shown in FIG. 4b whereby a first mould 18 receives molten plastic in a chamber 19 in the shape of the main body of the light guide. The mould includes protrusions 20 which form the grooves 16 in the light guide, but the opposite (outside) surface of the chamber does not include the shapes of the pyramidal part, instead, the main body formed in the first injection moulding step has a relatively uniform shape, which prevents sinking or deformation which can occur on cooling in surfaces opposite to a formation.

Once the main body has been formed in the first step, a second mould 21 shown in FIG. 4b receives the main body of the light guide. The inside surface corresponds exactly to the inside surface of the main body of the light guide, but the opposite surface of the mould includes extra space, which has recessed parts 22 corresponding in shape to the pyramidal formations. Molten plastic is thus injected into the additional space, filling the recessed parts and forming the pyramidal formations. Although these parts are of variable depth, because the molten plastic adheres to the already formed main body, there is no sinking and sharp corners can be formed on the facets, with no join line appearing where the final mould is formed. This results in a plastic part that, especially when backlit, appears very much like cut glass/crystal.

Radially inwardly of the tubular light guide 10, a main headlight guide 23 for the headlights is provided, behind which a matrix of LEDs 24 is located. The matrix of LEDs 23 is arranged such that different LEDs in the matrix can be lit to vary the amount and direction of light that exits the front of the headlight guide 23. However, like the ring 6, the headlight guide 23 is deliberately formed such that light which enters the rear of the guide 23 exits through the front and is not lost along the length. This can be achieved by tuning the optical characteristics of the main headlight guide 23, to achieve total internal reflection.

In use, the light assembly of the invention operates as a headlight by lighting the matrix of LEDs 24 in response to a signal from the onboard computer (not shown) in the vehicle 3, based on a manual operation, e.g. switching the lights on, or an automatic, sensory response, e.g. from light receiving sensors. Similarly, the daylight running lamps 6 are lit in response to a signal received from the onboard computer, which may be based on a manual or automatic response, such as receiving a door-unlock signal from a user, or turning a key in the ignition. The number of LEDs in the matrix 24, that are illuminated and hence the intensity of light exiting the headlight guide 23 can be varied in response to inputs. Thus the headlight may be able to have both main-beam and dipped beam functions.

The number of LEDs in the light source 12, which are illuminated to light the light guide 10, can also be varied, as can their intensity. In the method of the invention, this is done so as to achieve the optical effect of a dynamic movement of light along the length of the light guide 10. Accordingly, in response to a signal from the onboard computer, which may be based on receiving an unlock, or alert signal from a remote control, a welcome sequence is initiated, whereby initially, relatively few LEDs in the light source 12 are illuminated and their light intensity is low—this means that the majority of the light emitted from the light source 12 is output through the grooves in the inner surface of the light guide 10 near the rear, where the light source 12 is located. Gradually, e.g. over the course of 3-10 seconds, the number of LEDs and their intensity is increased, this results in the light appearing to slowly and dynamically move forwards and outwards to welcome the driver. Once the LEDs are fully illuminated, the daylight running lamp 6 may be illuminated and the intensity of light from the light source 12, may be decreased to zero, so as to create the effect of fading back inwards to the rear of the tubular light guide 10.

Coupled with the cut glass/crystal appearance, this effect is strikingly three dimensional and evokes an hand being outstretched for a handshake before being withdrawn, or a bow to welcome the driver.

In an alternative mode, the LEDs may remain illuminated until the automobile is switched off, at which point, the daylight running light 6 may be switched off, and following a period of e.g. 10 seconds to 3 minutes, sufficient for the driver or passenger to leave the automobile, the intensity of light emitted by the light source 12 may be gradually (e.g. over 3-10 seconds) reduced so as to provide the effect of withdrawal.

The light output from the light source 12 through the tubular light guide 10 also acts as a park light. Thus, when the automobile is switched off, but parking lights are selected, rather than gradually reducing, light continues to be emitted by the light source 12 showing off the crystal effect in the headlamp.

With reference to FIG. 5, a second embodiment of a light guide 110 for a light assembly according to the invention is similar to that of the first embodiment, and would sit within a similar reflective housing (not shown). The tubular light guide 110 is also generally frustoconical, following the shape of the reflective housing and extending from the opening at the rear towards the lens 4 at the front. However, a more substantial part of the rear portion 101 of the light guide 110 is tubular and of approximately constant diameter, whilst only about half of the total length of the light guide 110 constitutes a flared portion 102. Again, the front of the tubular light guide 110 tapers to a sharp edge 113.

The tubular light guide 110 is deliberately formed so as to emit light along its length. Thus, the rear of the tubular light guide 110 is also provided with an annular rear surface 111, which receives light from a corresponding light source (not shown). The annular rear surface 111 is provided with facets 103 thereon to diffuse light received from the light source.

Along the length of the tubular light guide 110, formations are made in the radially inside surface 114 and the radially outside surface 115 of the light guide 110, which reflect light and cause it to be emitted along the length of the tubular light guide 110. In particular, the radially inside surface 114 is provided with a series of criss-crossing grooves 116 which have a v-shaped cross section, and extend obliquely, across the light guide from the region where the flared section 102 meets the tubular section 101 to the sharp bevelled edge 113 at the front.

The radially outside surface, is again provided with facets 117, having sharp corners, so as to make up generally pyramidal formations which are suitably aligned behind the grooves 116, to give the appearance of cut glass/crystal.

The above embodiment is described by way of example only. Many variations are possible without departing from the scope of the invention as defined in the appended claims.

The invention claimed is:

1. A light assembly comprising a housing, the housing having a rear and a front, whereby in use light is emitted from the front of the housing; the assembly further comprising a transparent or translucent light guide extending from the rear to the front and at least partially surrounded by the housing; the light guide arranged to be lit at its rear and to emit light along at least part of its length, the light guide being provided with formations on/in its surface to emit light along at least part of its length; being tubular, having an interior surface, an exterior surface, a front end, a rear end, and a passage extending therebetween; wherein formations of one type are formed on the interior surface and formations of another type are formed on the exterior surface; and wherein the light guide is formed so as to emit at least 50% of the light that it receives from the light source at its rear, along its length from its interior surface.

2. A light assembly according to claim 1 wherein the housing is reflective.

3. A light assembly according to claim 1 having an array of light sources arranged in a ring at the rear end of the tubular light guide.

4. A light assembly according to claim 1 wherein the formations are notches, dimples, bumps, grooves and/or facets.

5. A light assembly according to claim 4 wherein the formations on/in the surface of the light guide are grooves formed in the surface or lines frosted on a surface of the light guide.

6. A light assembly according to claim 5 wherein the formations criss-cross the surface of the light guide.

7. A light assembly according to claim 1 wherein the formations on one surface are grooves and the formations on the other surface are facets formed by pyramidal formations extending from the surface of the light guide.

8. A light assembly according to claim 1 wherein the thickness of the light guide reduces from the rear to the front.

9. A light assembly according to claim 1 which flares from the rear to the front.

10. A light assembly according to claim 1 wherein the housing is provided with an aperture at the rear to receive a main light source, such as a main or dipped beam bulb, or a matrix module; and a light source which lights the rear of the light guide, the light source which lights the rear of the light guide being an auxiliary light source.

11. A light assembly according to claim 1 wherein the transparent/translucent light guide is tinted.

12. A light assembly according to claim 1 which is a vehicle light assembly, in particular an exterior vehicle light assembly, such as a headlight assembly or a taillight assembly.

13. An automobile comprising a light assembly according to claim 1.

14. A method of forming a light guide according to claim 1 the method comprising a two-stage injection moulding process, whereby a main body portion of the light guide is formed in a first injection moulding step and formations on at least one surface of the main body are formed in a second injection moulding step.

15. A method according to claim 14 wherein grooves on one surface are formed in the first step and facets in an opposing surface are formed in the second step.

16. A method of operating a light assembly; the light assembly comprising a housing, the housing having a rear and a front, whereby in use light is emitted from the front of the housing; the assembly further comprising a transparent or translucent light guide extending from the rear to the front and at least partially surrounded by the housing; the light guide arranged to be lit at its rear and provided with formations on/in its surface to emit light along at least part of its length and being tubular, having an interior surface, an exterior surface, a front end, a rear end, and a passage extending therebetween; and a light source arranged at the rear of the light guide; the method comprising gradually increasing the intensity of light supplied by the light source, such that light is emitted from its interior surface and appears to slowly progress along the length of the light guide.

17. A method according to claim 16 wherein the light source arranged at the rear of the light guide, to light the light guide, is an array of light sources, and the method comprises increasing the number of light sources that are lit, so as to increase the intensity of light.

18. A method according to claim 16 wherein the light intensity is gradually increased over the course of 3-10 seconds.

19. A method according to claim 16 further comprising gradually reducing the intensity of light.

20. A method according to claim 19 comprising gradually increasing the intensity of light supplied by the light source, then illuminating a further light source, then gradually reducing the intensity of the light supplied by the light source.

* * * * *